United States Patent
Wang (10) Patent No.: US 9,591,813 B2
(45) Date of Patent: Mar. 14, 2017

(54) MULTI-PURPOSE PLANT WATERING DEVICE AND SYSTEM THEREOF

(71) Applicant: Xiaopeng Wang, Seattle, WA (US)

(72) Inventor: Xiaopeng Wang, Seattle, WA (US)

(*) Notice: Subject to any disclaimer, the term of this patent is extended or adjusted under 35 U.S.C. 154(b) by 180 days.

(21) Appl. No.: 14/269,200

(22) Filed: May 4, 2014

(65) Prior Publication Data

US 2015/0313101 A1    Nov. 5, 2015

(51) Int. Cl.
*A01G 29/00* (2006.01)

(52) U.S. Cl.
CPC .................... *A01G 29/00* (2013.01)

(58) Field of Classification Search
CPC .... A01G 27/006; A01G 27/00; A01G 27/005; A01G 25/06; A01G 27/003; A01G 27/04; A01G 25/02; A01G 2031/007; A01G 25/16; A01G 25/165
USPC ........................................................ 47/48.5
See application file for complete search history.

(56) References Cited

U.S. PATENT DOCUMENTS

| | | | | |
|---|---|---|---|---|
| 2,084,005 A * | 6/1937 | Richards | ................ | A01G 27/06 239/44 |
| 4,499,686 A * | 2/1985 | Scragg | .................. | A01G 29/00 47/48.5 |
| 5,329,729 A * | 7/1994 | Liang | ..................... | A01G 27/06 47/81 |
| 6,237,283 B1 * | 5/2001 | Nalbandian | .......... | A01G 27/006 47/48.5 |
| 7,082,715 B2 * | 8/2006 | De Winter | ........... | A01G 27/006 222/187 |
| 7,712,253 B2 * | 5/2010 | Gesser | .................. | A01G 31/02 405/43 |
| 7,862,254 B2 * | 1/2011 | Jin Hyun | ............. | A01G 27/005 405/39 |
| 8,011,853 B2 * | 9/2011 | Gesser | ................. | A01C 23/042 405/39 |
| 8,413,372 B2 * | 4/2013 | King | ...................... | A01G 29/00 47/48.5 |
| 9,055,718 B2 * | 6/2015 | Geerligs | ................ | A01G 29/00 |
| 2014/0020290 A1 * | 1/2014 | Zinger | .................. | A01G 29/00 47/48.5 |

FOREIGN PATENT DOCUMENTS

CN    202635270 U    1/2013

* cited by examiner

*Primary Examiner* — Monica Williams
*Assistant Examiner* — George Andonyan
(74) *Attorney, Agent, or Firm* — Pai Patent & Trademark Law Firm; Chao-Chang David Pai (57) ABSTRACT

A plant watering device includes a first body portion, a second body portion having a chamber therein and connected to the bottom of the first body portion, a third body portion set on the top outer wall of the first body portion, and a water supplying tube which is inserted into one side of the third body portion, extending downwards along one side of the first and second body portions to the bottom of the second body portion and upwards along the opposite side of the second and first body portions, and out of the third body portion at the opposite side. Water is provided by the water supplying tube through a hole into the bottom of the chamber and its pressure is regulated using a micropore material block or a water-absorbent rod in the chamber, and a soft water-permeable disc at the bottom of the first body portion.

9 Claims, 9 Drawing Sheets

MULTI-PURPOSE PLANT WATERING DEVICE AND SYSTEM THEREOF

BACKGROUND OF THE INVENTION

Field of the Invention

The present invention relates to irrigation for plants and more particularly to a multi-purpose plant watering device and a system formed thereof allowing each of its plant watering devices to be placed at a respective elevation.

Description of the Related Art

In current plant cultivating processes, for example, plant potting, each plant is usually grown and cultivated individually, and water is supplied thereto by sprinkling via sprinkler heads. Sprinkling provides a simple way to wash the branches and leaves of the plant while allowing water to be absorbed by the plant. However, the sprinkled water may quickly evaporate from the branches and leaves of the plant and from the soil surface before the root of the plant absorbs adequate water, thus causing tremendous waste of water resources.

Other methods have been devised to supply water to plant roots. For instance, China Utility Patent No. CN202635270U discloses a root water supplying disc, which includes an upper cover connected to a lower body, forming a chamber in between. Further in the said root water supplying disc, at least one opening is provided on the upper cover in fluid communication with the chamber; a water inlet hose and a water outlet hose are respectively provided, at the same level, on two opposite sides of the lower body and in fluid communication with the chamber; a water overflow hose is provided on the side wall of the lower body above the water inlet hose and in fluid communication with the chamber; and a watering head is provided on each of the at least one opening of the upper cover to absorb water contained in the chamber. Through the watering head, the root water supplying disc continuously provides water to the soil around the plant root with the water that has entered and remained in the chamber. Because the root water supplying disc is well sealed, it is able to supply water to the plant while making good use of the water resources without much waster. However, the said root water supplying disc is limited to use at a particular elevation; when a number of the root water supplying discs are connected in series or in parallel, they have to be maintained essentially at the same elevation and a relatively low water pressure must be maintained. Therefore, the root water supplying disc clearly cannot satisfy the need to place plant pots at various different elevations to achieve a desired aesthetic effect, particularly in decorative bonsai design. Moreover, the root water supplying disc has to be inserted into the bottom of the plant pots, making it rather inconvenient to position the pots and troublesome to operate the discs.

Due to the above-mentioned deficiencies of the prior art plant watering devices, a new and more sophisticated plant watering device is needed which can satisfy the need to place the plant watering devices within a plant watering system at various respective elevations according to the landscaping design and which is convenient to position and easy and practical to operate.

BRIEF SUMMARY OF THE INVENTION

The primary objective of the invention is to provide a plant watering device which can satisfy the need to place the plant watering devices within a plant watering system at various respective elevations according to the landscaping design and which is convenient to position and easy and practical to operate.

The plant watering device according to the first embodiment of the invention includes a water-absorbent first body portion; a second body portion connected to the bottom of the first body portion and having an open chamber in fluid communication with the bottom of the first body portion; and a water supplying tube extending downwards along one side of the first body portion and the second body portion to the bottom of the second body portion and extending upwards along an opposite side of the second body portion and the first body portion. A water passage hole is formed at the bottom of the second body portion and connected to the open chamber, corresponding to a water outflow opening formed in the water supplying tube. Therefore, water entering one end of the water supplying tube is able to flow through the water outflow opening and the water passage hole of the second body portion into the open chamber and then permeate upwards (due to water pressure or capillarity) through the second body portion and the first body portion for supplying water to nearby soil and plant.

The plant watering device further includes a primary water pressure reducing mechanism disposed in the open chamber and a secondary water pressure reducing mechanism disposed between the open chamber and the bottom of the first body portion for moderating and regulating the pressure of the water flowing out from the top and the periphery of the first body portion to the nearby plant and soil. In the first embodiment of the plant watering device, the primary water pressure reducing mechanism is in the form of a micropore material block filling inside the open chamber, and the secondary water pressure reducing mechanism is in the form of a soft water-permeable disc embedded at the bottom of the first body portion. With this arrangement, the pressure of the water flowing out through the top and the periphery of the first body portion will be properly moderated and regulated to assure water supply to the nearby soil and plant. The first embedment of the plant watering device is suitable in situations where the water supplying tube is closed or plugged at one end so that a relatively high back pressure is created or where the source water pressure is relatively high.

To facilitate initial water follow through the plant watering device, a vertical and coextensive air vent hole may be formed in the middle of the first body portion to allow air in the water supplying tube and inside the open chamber to rise through the air vent hole. Furthermore, two vertical grooves may be formed on two opposite sides of the first body portion for two sections of the water supplying tube (across the water outflow opening) to be embedded therein, respectively. The second body portion is preferably formed in a bullet-like shape pointing downwards to facilitate insertion of the plant watering device into the soil.

In addition, the plant watering device may further include a third body portion tightly set over the top outer wall of the first body portion and having two openings formed through two opposite sides thereof. One end of the water supplying tube is inserted through one of the two openings and the other end of the water supplying tube is inserted through the other opening of the third body portion. Optionally, the top end of the third body portion may be formed with an extended rim to facilitate the holding and operation (insertion into and removal from the soil) of the plant watering device.

The second embodiment of the plant watering device is different from the first embodiment only in that the primary water pressure reducing mechanism is in the form of a water-absorbent rod extending from inside the water outflow opening of the water supplying tube, through the water passage hole, to the bottom of the first body portion. This second embodiment is suitable in situations where the water entering the water supplying tube at one end is allowed to flow out at the other end (e.g. to be recycled) or where the source water pressure is relatively low.

Finally, a plurality of the plant watering devices according to the present invention may be connected in series or in parallel to form a plant watering system, in which each plant watering device within the system may be placed at its respective elevation.

BRIEF DESCRIPTION OF THE DRAWINGS

Preferred embodiments of the present invention will be described in conjunction with the following figures.

DETAILED DESCRIPTION OF THE INVENTION

The present invention will be described below in detail by way of particular embodiments in conjunction with the accompanying figures.

As shown in FIGS. 1-5, a first embodiment of the multi-purpose plant watering device 1 according to the present invention includes a first body portion 2, a second body portion 3 connected to the bottom end of the first body portion 2, a third body portion 4 set on top of the first body portion 2, and a water supplying tube 7 with a water inlet end 5 and a water outlet end 6. The water supplying tube 7 extends from the water inlet end 5 downwards along one side of the first and the second body portions 2,3 to the bottom end of the second body portion 3 and then upwards along the opposite side of the second and the first body portions 3,2, to the water outlet end 6. The first body portion 2 is made of a rigid water-absorbent material such as a micropore material. The second body portion 3 has an open chamber 8 formed therein; the open chamber 8 is in fluid communication with the first body portion 2 above. A water passage hole 9 is formed at the bottom end of the second body portion 3, corresponding in position to a water outflow opening 23 formed in the water supplying tube 7 such that the water passage hole 9 is in fluid communication with the water supplying tube 7 through the water outflow opening 23. Thereby, water entering the water inlet end 5 of the water supplying tube 7 can flow through the water outflow opening 23 and the water passage hole 9 into the open chamber 8 and, after passing through the primary water pressure reducing mechanism, permeate upwards through the top and the periphery of the first body portion 2 to supply water to nearby plant and soil.

Figure 1:
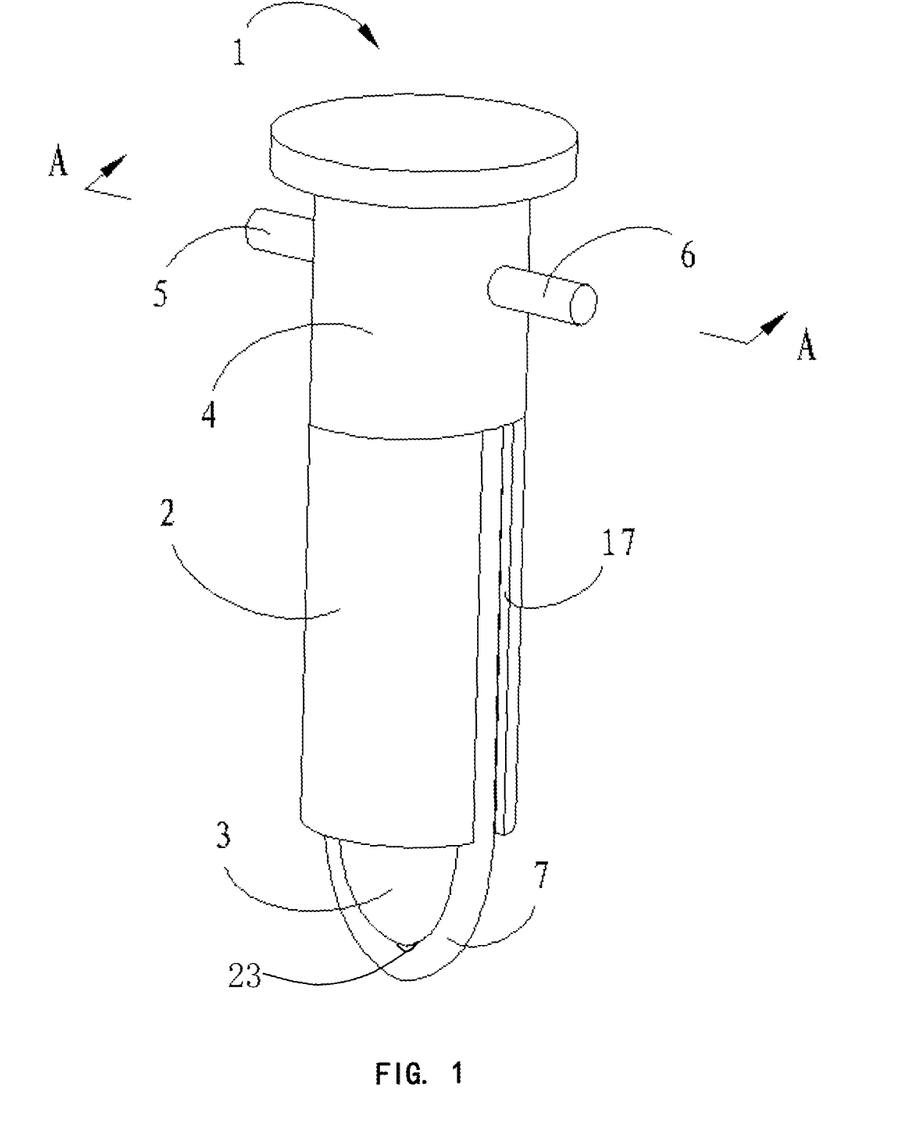
FIG. 1 shows the structure of the multi-purpose plant watering device according to the present invention.
Figure 2:
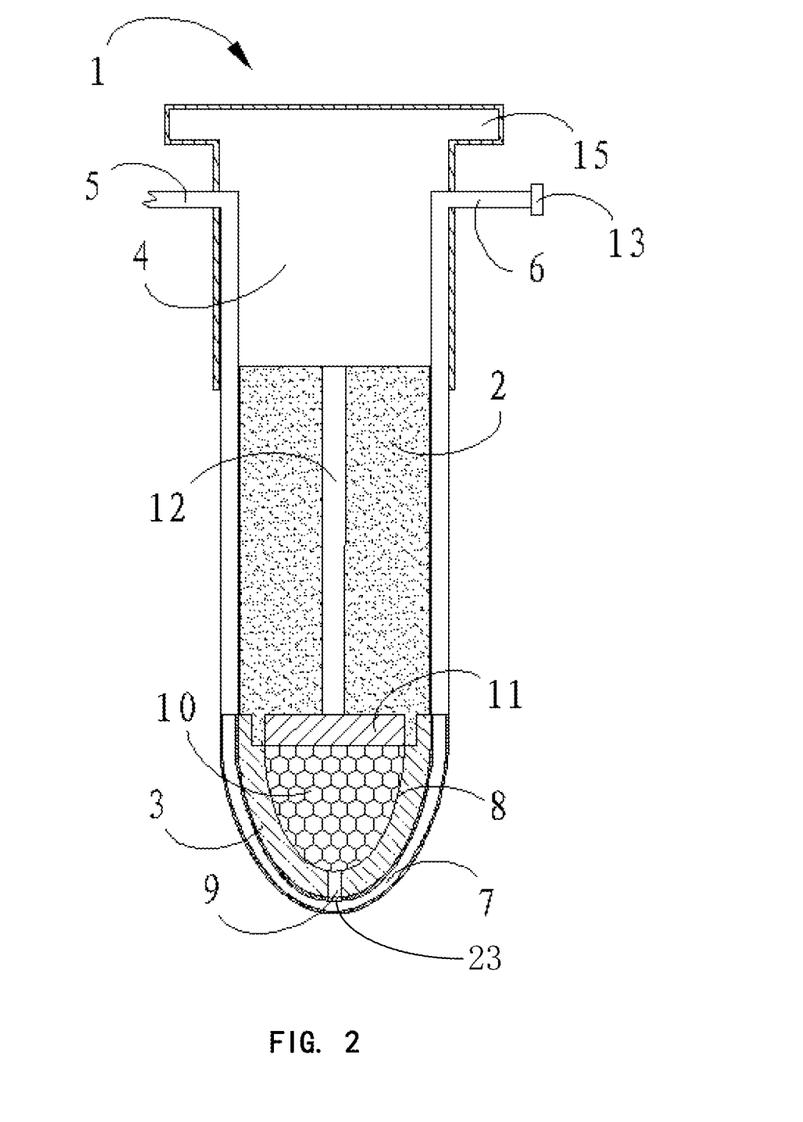
FIG. 2 shows the cross section of the structure shown in FIG. 1 as viewed along A-A, for a first embodiment of the present invention.
Figure 3:
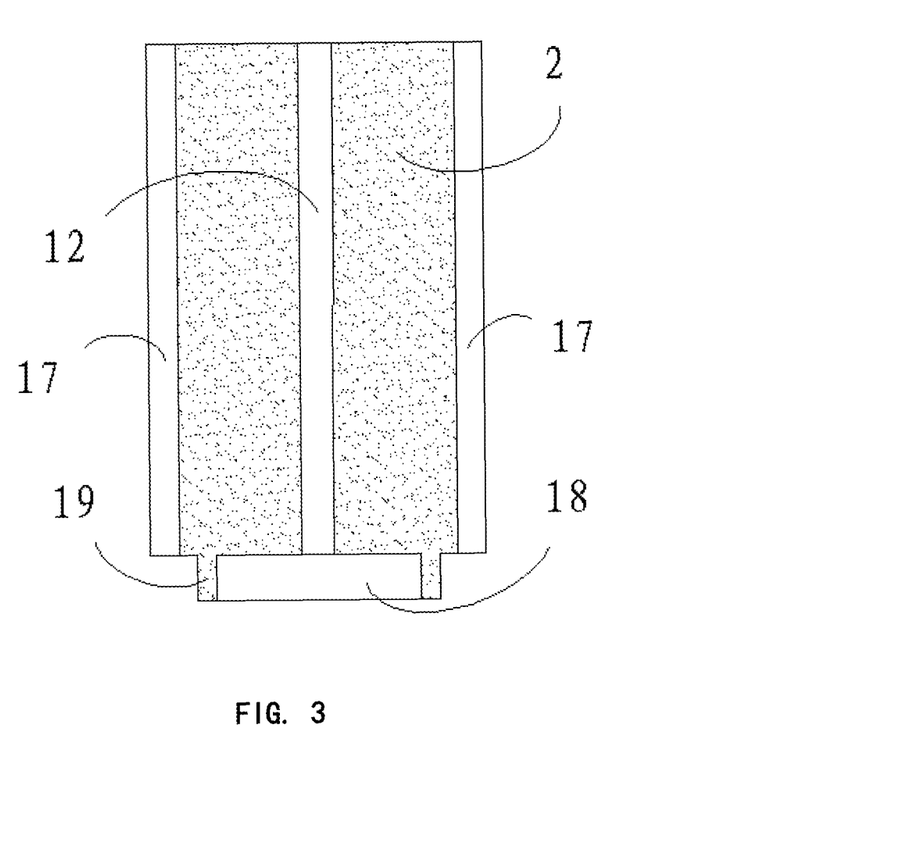
FIG. 3 shows the structure of the first body portion of the multi-purpose plant watering device according to the first embodiment of the present invention.

Two grooves 17 on each of two opposite side walls of the first body portion 2 for two sections of the water supplying tube 7 across the water outflow opening 23 to be embedded therein, respectively. Namely, one of the two sections is on the side of the water outflow opening 23 near the water inlet end 5 and the other section is on the side of the water outflow opening 23 near the water outlet end 6.

Figure 4:
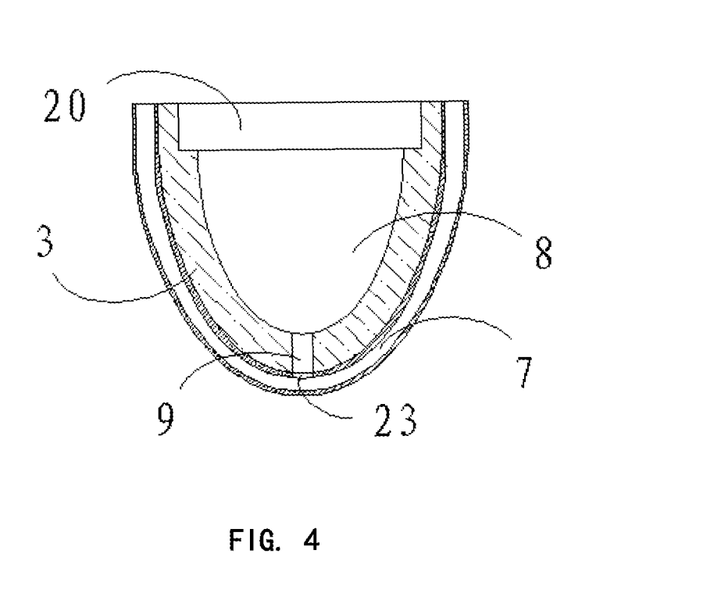
FIG. 4 shows the structure of the second body portion of the multi-purpose plant watering device according to the first embodiment of the present invention.

As illustrated in the figures, the second body portion 3 is preferably made in a downwards pointing conical or bullet-like shape. The water supplying tube 7 is disposed along the outer contour of the second body portion 3 for connecting to a water source via its water inlet end 5. The open chamber 8 inside the second body portion 3 also has a corresponding conical shape. The open chamber 8 is connected at the top with the first body portion 2 and has a water passage hole 9 in communication with the water supplying tube 7 through the water outflow opening 23.

Further, a primary water pressure reducing mechanism 10 is provided in the open chamber 8 for moderating the pressure of the water entering the open chamber 8 from the water supplying tube 7. Besides, a secondary water pressure reducing mechanism 11 is disposed between the top of the open chamber 8 and the bottom end of the first body portion 2 for moderating the pressure of the water flowing from the open chamber 8.

Figure 5:
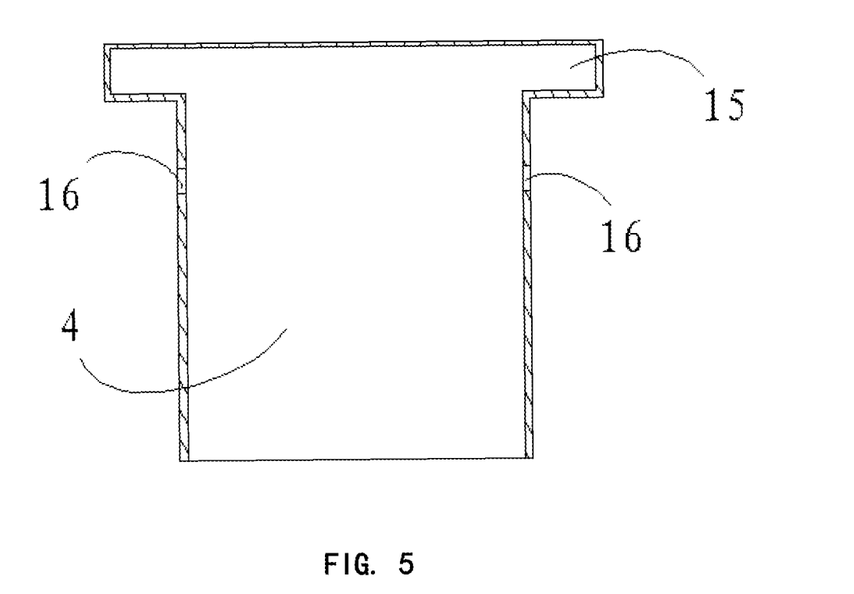
FIG. 5 shows the structure of the third body portion of the multi-purpose plant watering device according to the first embodiment of the present invention.

The third body portion 4 is set on top of the first body portion 2. The third body portion 4 has two openings 16 respectively formed through two sides thereof to receive the water inlet end 5 of the water supplying tube 7 via one of the two openings 16 and the water outlet end 6 of the water supplying tube 7 via the other opening 16. Thus, the water supplying tube 7 extends from one side of the third body portion 4, downwards along one side of the first body portion 2 and the second body portion 3, past the bottom of the second body portion 3 and continues upwards along the opposite side of the second body portion 3 and the first body portion 2, and through the opposite side of the third body portion 4.

The structure of the first body portion 2 of the multi-purpose plant watering device 1 according to the first embodiment of the present invention is shown in FIG. 3. The first body portion 2 is preferably made of a rigid micropore water-absorbent material. The first body portion 2 is of a cylindrical shape with two grooves 17 extending the length of the first body portion 2 on two opposite sides. As mentioned above, two sections of the water supplying tube 7, one near the water inlet end 5 and the other near the water outlet end 6, are embedded in the two grooves 17, respectively. The two sections of the water supplying tube 7 may be firmly fixed to the grooves 17 with glues or binding rings. A connecting protrusion 19 is provided at the bottom end of the first body portion 2 for connecting to the second body portion 3. The connecting protrusion 19 has a smaller outer dimension than the outer wall of the rest of the first body portion 2 and has a recessed hole 18 at its bottom.

The structure of the second body portion 3 of the multipurpose plant watering device 1 according to the first embodiment of the present invention is shown in FIG. 4. The second body portion 3 may be made of PVC (polyvinyl chloride), but is not limited to such material. The outer perimeter of the second body portion 3 is gradually reduced in diameter from top to bottom, forming a bullet-like outer contour to facilitate insertion of the plant watering device 1 into the soil. The water passage hole 9 is formed at the bottom end of the second body portion 3 below the open chamber 8. The water passage hole 9 is in fluid communication with the open chamber 8 and corresponding in position to the water outflow opening 23 formed in the water supplying tube 7. The water supplying tube 7 extends along the outer contour of the second body portion 3 on both sides of the water outflow opening 23. A connecting recess 20 concentric with the open chamber 8 is formed above the open chamber 8. The connecting recess 20 has a dimension matching that of the connecting protrusion 19 of the first body portion 2 for the connecting protrusion 19 to be firmly mated with and embedded in the connecting recess 20, thus connecting the second body portion 3 with the first body portion 2. Alternatively, the first body portion 2 and the second body portion 3 may be glued together without the connecting protrusion 19 and the connecting recess 20.

The structure of the third body portion 4 of the multipurpose plant watering device 1 of the present invention is shown in FIG. 5. The third body portion 4 may be made of PVC (polyvinyl chloride), but is not limited to such material. The third body portion 4 is essentially a cylindrical shell with a closed top end and an open bottom end. The open bottom end of the third body portion 4 can be firmly set over the top outer wall of the first body portion 2 to connect to the first body portion 2. To facilitate holding and operation (insertion into and removal from soil) of the plant watering device 1, the top end of the third body portion 4 may be formed with an extended rim 15 as shown in FIG. 5. The two openings 16 of the third body portion 4 are formed on two opposite sides of thereof below the extended rim 15 for the water inlet end 5 and the water outlet end 6 of the water supplying tube 7 to pass through.

In using the plant watering device 1 of the first embodiment, the water inlet end 5 of the water supplying tube 7 is connected to a water source (not shown). When the water outlet tube 6 is plugged by a plug 13, the water entering into the open chamber 8 from the water supplying tube 7 through the water outflow opening 23 will have a relatively higher pressure due to back pressure. Therefore, it is important to have certain water pressure reducing mechanism in the water path.

The primary water pressure reducing mechanism 10 is provided in the open chamber 8 and the secondary water pressure reducing mechanism 11 is provided between the open chamber 8 and the bottom end of the first body portion 2. In this embodiment, the primary water pressure reducing mechanism 10 is in the form of a micropore material block 10 made of a micropore water-absorbent material. The micropore material block 10 has an outer contour corresponding to the inner wall of the open chamber 8. In other words, the micropore material block 10 essentially fills up the open chamber 8. The micropore material block 10 buffers the water flow, thus reducing the pressure of the water entering the open chamber 8. Because the water entering the open chamber 8 must pass through the micropore material block 10 to reach the top of the open chamber 8, its pressure is gradually reduced along the way.

To further buffer and reduce the pressure of the water entering the first body portion 2 from the open chamber 8, the secondary water pressure reducing mechanism 11 is provided between the open chamber 8 and the bottom end of the first body portion 2. Preferably, the secondary water pressure reducing mechanism 11 is in the form of a water-permeable disc 11 embedded in the recessed hole 18 at the bottom end of the first body portion 2. The water-permeable disc 11 is preferably made of a soft material so that it can tightly fit inside the recessed hole 18 and may be made of a fibrous material.

To facilitate initial water flow through the plant watering device 1, a vertical air vent hole 12 may be formed in the middle of the fist body portion 2. The air vent hole 12 extends along the entire length of the first body portion 2.

Figure 6:
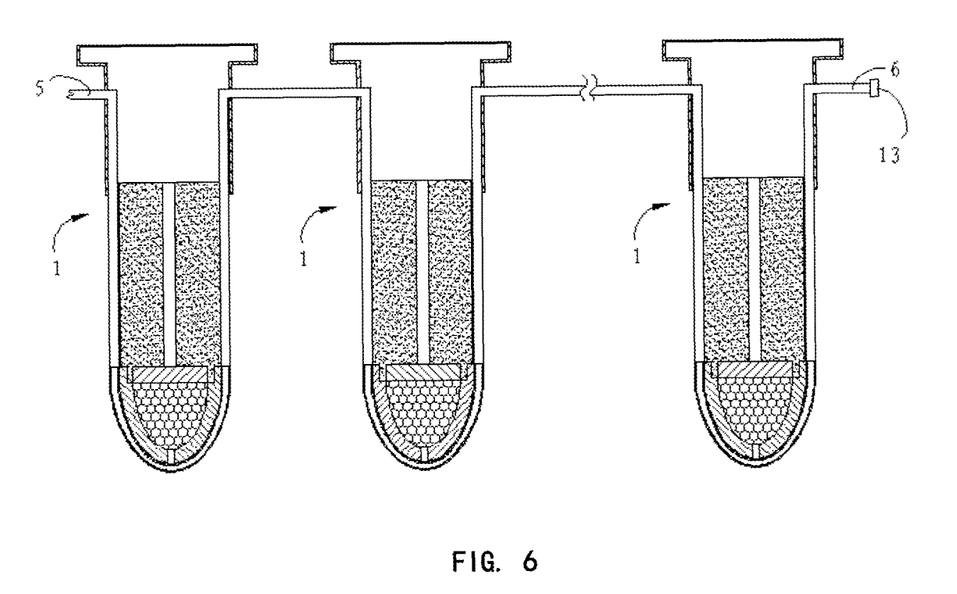
FIG. 6 shows a plant watering system with three multi-purpose plant watering devices according to the first embodiment of the present invention connected in series.
Figure 7:
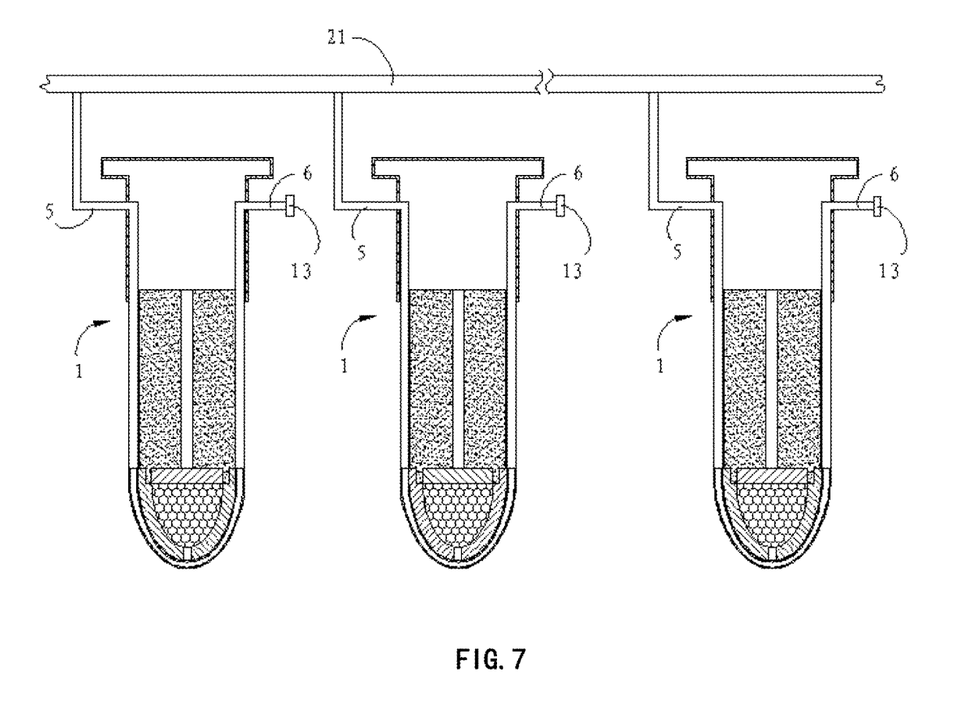
FIG. 7 shows a plant watering system with three multi-purpose plant watering devices according to the first embodiment of the present invention connected in parallel.

The first embodiment of the plant watering device 1 of the present invention may be used individually, as shown in FIG. 1, or a number of the plant watering devices 1 may be connected in series (as in FIG. 6) or in parallel (as in FIG. 7) to form a plant watering system. When connected in series, water enters the water inlet end 5 of the water supplying tube 7 of first plant watering device 1, and the water outlet end 6 of the water supplying tube 7 of the last plant watering device 1 in the plant watering system is preferably blocked by a plug 13 to create a water back pressure. When connected in parallel, the water inlet end 5 of each plant watering device 1 is connected to a water source main pipe 21 so that water enters the water inlet end 5 of each plant watering device 1, and the water outlet end 6 of each plant watering device 1 is preferably blocked by a plug 13 to create water back pressure. Each of the plant watering devices 1 in the plant watering system may be placed at a respective elevation, according to the need of the landscaping design. If the water demand of the plants irrigated by the plant watering system cannot be adequately satisfied by the capacity of the plant watering system, water dripping devices or other watering means or devices may be added to supplement the water supply to assure adequate watering of the plants.

Figure 8:
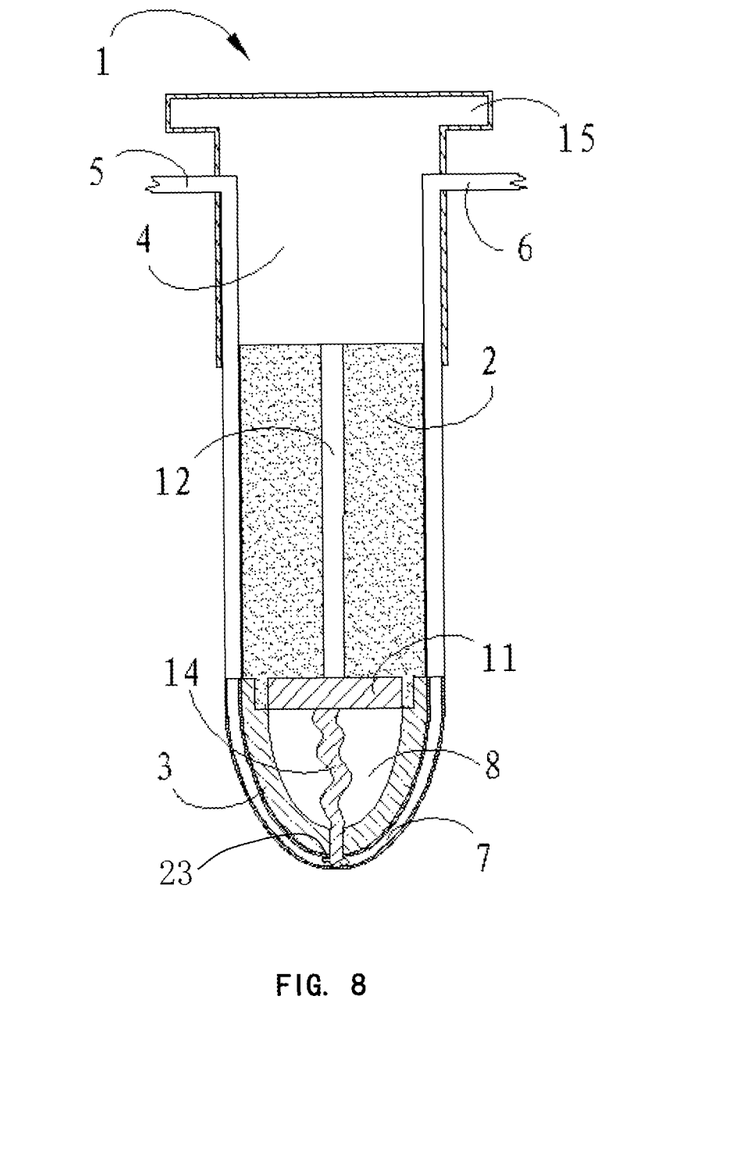
FIG. 8 shows the structure of the multi-purpose plant watering device according to a second embodiment of the present invention.

A second embodiment of the plant watering device 1 according to the present invention is shown in FIG. 8. The second embodiment is similar to the first embodiment described above except that the primary water pressure reducing mechanism 10 is provided in the form of a water-absorbent rod 14, which may be a water-absorbent rope. The water-absorbent rod 14 extends from the bottom end of the first body portion 2 or the secondary water pressure reducing mechanism 11 (e.g., a water-permeable disc, if installed) to inside the water outflow opening 23 of the water supplying tube 7. The water-absorbent rod 14 may be fixed in position with glues or by other means.

The second embodiment of the present invention is suitable for situations where water flows through the water supplying tube 7 and circulates back to the water source. Namely, water from the water source flows under pressure through the water inlet end 5 of the water supplying tube 7 and flows out of the water outlet end 6 of the water supplying tube 7 to return to the water source. Because the water circulates in and out the water supplying tube 7, the water pressure in the water supplying tube 7 is relatively lower. The water enters the open chamber 8 by way of the water-absorbent rod 14 absorbing the water from the water supplying tube 7. When the water pressure fluctuates in the water supplying tube 7, the water-absorbent rod 14 buffers the pressure and together with the soft water-permeable disc 11 assures a stable water pressure of the water being supplied to the nearby soil or plant.

Figure 9:
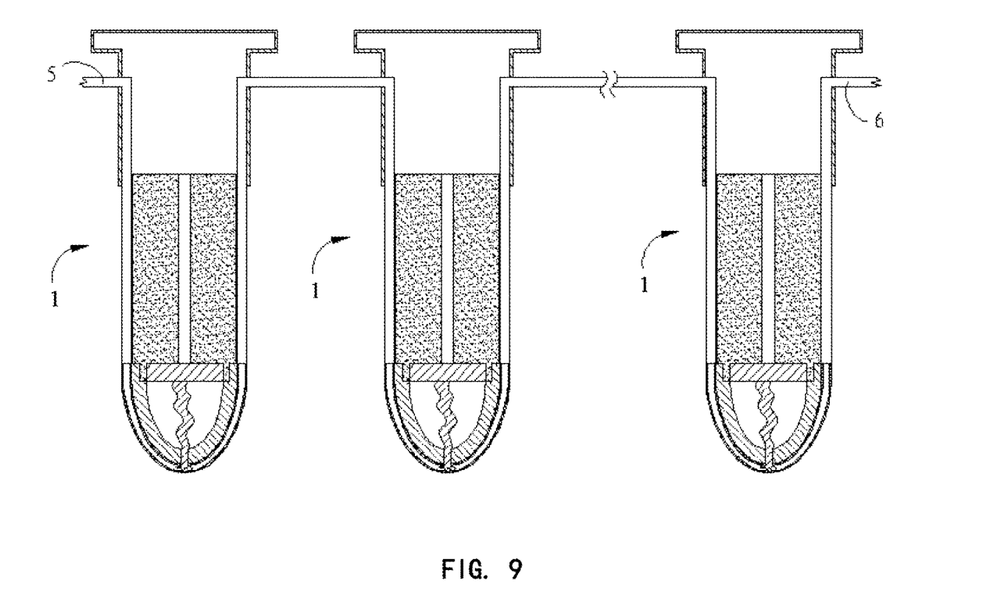
FIG. 9 shows a plant watering system with three multi-purpose plant watering devices according to the second embodiment of the present invention connected in series.
Figure 10:
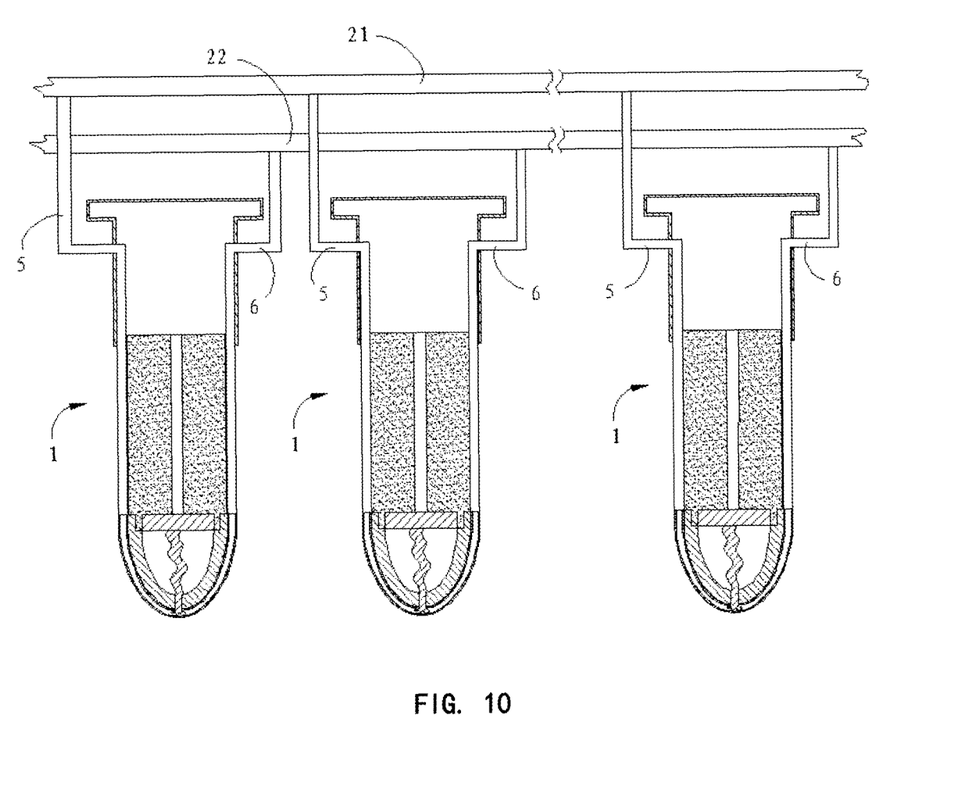
FIG. 10 shows a plant watering system with three multi-purpose plant watering devices according to the second embodiment of the present invention connected in parallel.

The second embodiment of the plant watering device 1 of the present invention may be used individually, as shown in FIG. 8, or a number of them may be connected in series (as in FIG. 9) or in parallel (as in FIG. 10) to form a plant watering system. When connected in series, water enters the water inlet end 5 of the water supplying tube 7 of the first plant watering device 1, and exits through the water outlet end 6 of the water supplying tube 7 of the last plant watering device 1 in the plant watering system to be directed back to the water source. When connected in parallel, the water inlet end 5 of each of the plant watering device 1 is connected to a water source main pipe 21, and the water outlet end 6 of each of the plant watering device 1 is connected to a water return main pipe 22. Thus, water from the water source main pipe 21 enters the water inlet end 5 of each plant watering device 1 in the plant watering system, and exits the water outlet end 6 of each plant watering device 1 to be returned to the water return main pipe 22. Each of the plant watering devices 1 in the plant watering system may be placed at a respective elevation, according to the need of the landscaping design. If the water demand of the plants irrigated by the plant watering system cannot be adequately satisfied by the capacity of the plant watering system, water dripping devices or other watering means or devices may be added to supplement the water supply to assure adequate watering of the plants.

Although particular embodiments of the present invention have been described in detail for purposes of illustration, various modifications and enhancements may be made without departing from the spirit and scope of the invention. Accordingly, the invention is not to be limited except as by the appended claims.

What is claimed is:

1. A plant watering device, comprising:
 a water-absorbent first body portion, a second body portion having an open chamber therein and connected to a bottom end of the first body portion, and a water supplying tube having a water outflow opening formed between two ends thereof, wherein the water supplying tube is entirely outside of the open chamber and has a middle section containing the water outflow opening passing adjacent a bottom end of the second body portion, wherein
 the open chamber is in fluid communication with the first body portion above;
 wherein the second body portion has a conical or bullet-like shape pointing downwards;
 a water passage hole is formed at the bottom end of the second body portion-adjacent and immediately next to the water outflow opening of the water supplying tube; and
 a primary water pressure reducing mechanism is provided in the open chamber; whereby
 a water flow entering one either of the two ends of the water supplying tube will divide at the water outflow opening so that a portion of the water flow is able to flow through the water outflow opening and upwards through the water passage hole into the open chamber and, after the portion of the water flow through the water passage hole passes about the primary water pressure reducing mechanism, an amount of water from the water flow is able to permeate upwards through the first body portion for supplying water to nearby plant and soil;
 a secondary water pressure reducing mechanism between the open chamber and the bottom end of the first body portion,
 wherein the secondary water pressure reducing mechanism includes a water-permeable disc disposed at the bottom end of the first body portion.

2. The plant watering device as claimed in claim 1, wherein the primary water pressure reducing mechanism includes a micropore material block filling inside the open chamber.

3. The plant watering device as claimed in claim 1, wherein the primary water pressure reducing mechanism includes a water-absorbent rod extending from inside the water outflow opening of the water supplying tube, through the water passage hole of the second body portion, to the bottom end of the first body portion.

4. The plant watering device as claimed in claim 1, further comprising a vertical air vent hole formed in the middle of the first body portion and coextensive with the first body portion for allowing air in the water supplying tube or in the open chamber to vent out above the first body portion.

5. The plant watering device as claimed in claim 1, further comprising two substantially vertical grooves formed on two opposite sides of the first body portion for two sections of the water supplying tube across the water outflow opening of the water supplying tube to be embedded therein, respectively.

6. The plant watering device as claimed in claim 1, further comprising a third body portion with an inner cavity and connected to a top outer wall of the first body portion, wherein one end of the water supplying tube is inserted through one side of the third body portion, and the other end of the water supplying tube is inserted through an opposite side of the third body portion.

7. A plant watering system, comprising a plurality of the plant watering device as claimed in claim 1 connected in series.

8. A plant watering system, comprising a plurality of the plant watering device as claimed in claim 1 connected in parallel.

9. The plant watering device as claimed in claim 1, wherein at least one of the two ends of the water supplying tube is disposed above a top end of the first body portion to serve as the end of the water supplying tube for water to enter through and then descend to the water outflow opening by gravity.

\* \* \* \* \*